April 19, 1966     R. W. MOUNT     3,246,498
BENDING TOOL
Filed Nov. 15, 1963
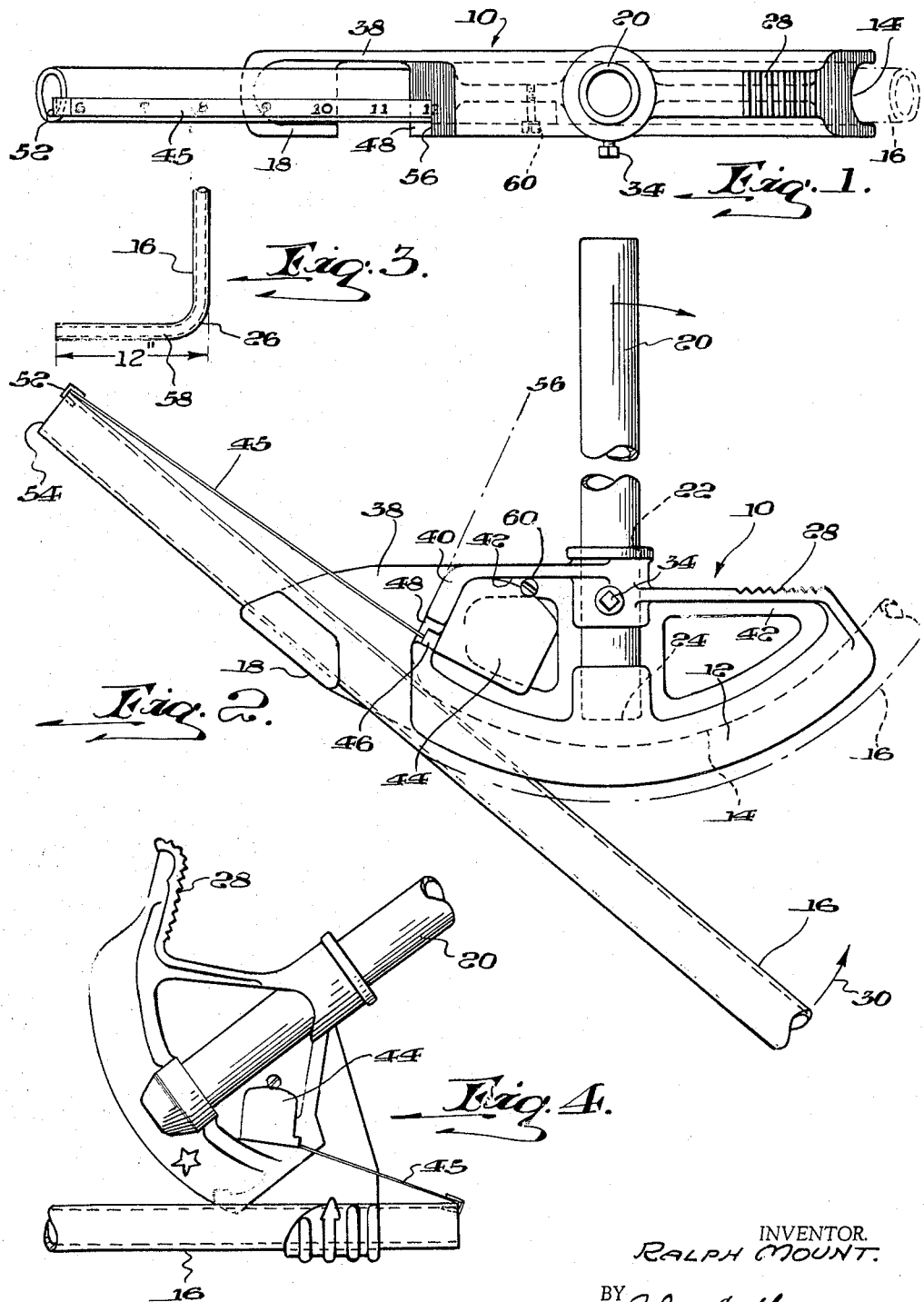
INVENTOR.
RALPH MOUNT.
BY John A. Young
HIS ATTORNEY

United States Patent Office 3,246,498
Patented Apr. 19, 1966

3,246,498
BENDING TOOL
Ralph W. Mount, R.D. 1, Zelenople, Pa.
Filed Nov. 15, 1963, Ser. No. 324,041
1 Claim. (Cl. 72—34)

This invention relates to an improved bending tool for forming 90° bends in relatively thin cross section members such as conduits, pipe, tubing and the like such as electrical conduits or the like, but is not limited to a particular structure or application but is usable for shaping, that is, bending, any of a large number of bendable members.

There has been proposed in the prior art numerous kinds of tools for properly dimensioning parts of a conduit following a shaping operation such as bending. There is a practical need for such tools because it is necessary in fabricating an electrical conduit system in a building to provide that the conduits fit together and follow certain prescribed paths around doorways and the like and terminate accurately at a juncture box, without excessive cutting and fitting of the conduits. If, for example, a considerable amount of cutting and joining operations are required then this adds to the expense of construction, and such expenses can only be held to a minimum, by accurately locating the point where a bend is required in relation to the rest of the conduit so that accurate fabricating of the conduit system can take place with minimum expense attendant with over-shooting or under-shooting in fitting the courses of conduits together and making them terminate at the right location and follow the precise paths within the walls, floors, ceilings, etc. of the building.

Those expedients which have been proposed in fabricating conduits, by incorporating various measuring devices, prove to be somewhat complicated in application for the electrician possessed of ordinary skill in the art. Consequently, such expedients while perhaps useful in end result have been overlooked in favor of "estimate" type bending which, in the hands of a skilled artisan is somewhat precise but is still unsatisfactory; in the hands of a less skilled estimator such guess-type operation is completely unsatisfactory.

Accordingly, one of the objects of the present invention is to provide an improved bending device for tubes, conduits, pipes and the like which will readily locate the correct point of bending in relation to the end of a conduit so that after the bending is completed, the conduit end is precisely located in relation to the bend thus eliminating or at least avoiding necessity for costly cutting and fitting steps which are necessitated when the conduits fail to meet together at the proper points or fail to terminate at the proper points.

It is a further object of the present invention to provide a novel bending tool which incorporates a measuring device which will directly read the proper distance at which a bend should be made in order to locate the end of the conduit at an exact point in relation to the bend, after the bending operation is effected.

Another object of the present invention is to provide a measuring device which can be readily incorporated into a bender and in such manner that it is adequately protected against injury during normal use of the bender but is readily accessible by the user to obtain a precise location of bending in order to accurately fabricate a course of conduits, whereby the conduits are caused to follow precisely determined paths, and intersect at precise locations in order to minimize cutting and fitting operations. As a result, the fabrication of the line is more accurate and has a fewer number of joints and thus saves the materials of construction.

Other objects and features of the present invention will become apparent from a consideration of the following description and the accompanying drawings, wherein:

FIGURE 1 is a top view of bending apparatus;
FIGURE 2 is a side elevation view of the apparatus shown in FIGURE 1 in which the bender is located in relation to the end of the conduit so that the end of the conduit will be a measured distance from the transverse part of the conduit, for example a distance of 12 inches or any other distance desired;
FIGURE 3 is a reduced size showing of the conduit after it is shaped by the bender and the end is located a precise distance from the rest of the conduit; and,
FIGURE 4 illustrates the invention in conjunction with a bender constituting a further embodiment.

Referring now to the drawings, the bender designated generally by reference numeral 10 includes a shoe portion 12 having a recess 14 in which the pipe fits while it is being bent about the shoe 12 as a fulcrum. That is, the pipe is caused to wrap around the recess or, arcuate inner surface 14, which is radiused to be of approximately the same radius as conduit 16. While the conduit is caused to wrap around the recess 14 of shoe 12 by bending finger 18 which passes over the surface of the conduit opposite the surface of the recess 14, recess 14 serves as a fulcrum and the bending is produced by the finger 18 through a handle 20 which passes through sleeve 22 and into socket 24, the handle 20 being sufficiently long to provide a substantial leverage whereby normal adult strength is sufficient to bend a section of the conduit about the fulcrum recess, i.e., the shoe 14 is caused to bend by the finger 18 through 90°, the bend being referenced by 26 (FIGURE 3). To assist in bending, manual effort is exerted at the handle 20 and surface 28 and is serrated to serve as a stepping point whereby the weight of the operator can be used to complement the pull on the handle 20 to bend the pipe around the shoe 14 by the finger 18. The pipe is bent from the full line position 16 to the dotted line position 16 as indicated by the arrow 30.

The handle is held in place by a set screw 34 which is removed or loosened to detach the handle 20 in the bender when the apparatus is to be stored. A strengthening web 38 is formed as a part of the shoe to prevent its distortion, and lateral flanges 40, 42 are further strengthening means to prevent distortion in the shoe.

Within recess 43, is located a casing 44 having a self-winding tape therein, spring-biased, so that the tape 45 is withdrawn against a yieldable spring resistance and is held yieldably in retracted or fully wound position. A flange 46 of the casing 44 is received through opening 48 whereby the measuring tape 45 can be withdrawn and the hook end 52 temporarily secured to the end 54 of conduit 16. Using the marking line 56 (FIGURE 2) which corresponds to the face edge of flange 40, the hooked end 52 of the tape 45 is first attached to the conduit end 54 and the shoe then located at whatever point is required in order to yield the desired measure of length for portion 58 indicated by the measurement "12 inches" in FIGURE 3 or any other distance that the conduit end 54 is desired to be located from the bend 26. If for example, it is desired to provide a length of 12 inches distance of the end 54 from the bend 26, then the hook end 52 is first attached to the conduit end 54 and the shoe then moved along the length of the conduit 16 until the desired measurement is read directly off of the scale line or marking line 56, which is the face edge of the flange 40. The distance is measured directly from the tape 45 and no calibration, calculation or the like is necessitated by the operation.

In fabricating, the conduit system, in relation, for example to a junction box where it is desired to terminate the end of the conduit in a precise location, following a 90° bend it is a very simple matter to accurately establish such dimension by merely establishing the required dimension, drawing the measuring tape out through opening 48, fixing the hook end 52 of the tape 45 to the conduit end 54 and then sliding the shoe along the length of conduit 16 until the distance desired is read directly from the tape at the marking or measuring line 56. The tape is calibrated in relation to the curvature of the bending surface 14, and is perpendicular to the transverse section of the conduit. In this manner, the tape is calibrated so that a direct reading of distance of the end of the conduit from the bend is possible from the measuring tape. By calibration is meant that the end of the tape starts with some number higher than one, as for example, six, or the like, and although the inches which are measured by the tape are true inches, the beginning point of measurement is so provided that the loss from the shrink in the conduit from effecting the bend is automatically taken into account. Depending, of course, upon the size of the conduit, tool, etc., the beginning measurement can be six or any other number depending upon the calibration value which takes into account these factors, such as conduit size, tool size, etc.

The tape casing 44 is shielded by the web 38 and recess so that it is not easily dislodged and is held securely in place by a machine screw or the like 60. In this manner, the tape is protected and cannot easily be damaged by normal handling of the bender even though work construction sites are noted for rough handling.

The tape 45 can be located on numerous other benders as shown in FIGURE 4, all that is required is that the tape be located so that its measuring end, is extendible and connects with the free end of the conduit and that it is disposed perpendicularly to the shank or transverse part of the conduit when the bending is completed. The tape is initially calibrated so that the distance from the end of the conduit to the transverse portion of the conduit is directly indicated by the measuring tape (FIGURE 3), that is, the tape is so calibrated that the distance is read directly from the marking line 56. Thus, the operator merely hooks the end of the measuring tape over the end of the conduit then slides the shoe to the point where the measuring tape reads directly the desired length (FIGURE 3) and the bending is effected while the tape is held in place, the tape being securely held throughout the bending so that the operator is better capable of holding the necessary bending position.

When the bending is completed, the hook 52 is detached and the tape 50 will wind itself up automatically in the casing 44 where it remains until the next operation.

The described operation is quick, accurate and minimizes cutting with a consequent waste of material and produces a more precisely constructed conduit.

While the present invention has been illustrated and described with certain example embodiments thereof, it will be understood that this is illustrative of the invention and is by no means restrictive thereof. Those skilled in the art can be expected to make numerous changes in both the construction and method of forming the article, and it is intended that such changes and revisions which incorporate the principles disclosed herein will be included within the scope of the following claim as equivalents of the invention.

What is claim is:

A portable bending tool for shaping relatively thin cross-section conduits, pipe or the like such as are used in electrical conduits, and accurately locating the end of the conduit from the bend after such bending is effected, comprising: a shoe having an arcuate mandrel with a recess therein proportioned to receive a section of such conduit or pipe therein, a bending finger spaced slightly from said mandrel to provide a slot whereby said tool is slipped over the conduit or pipe to effect the bending at a preferred position thereon, said finger serving as the fulcrum about which the pipe is caused to bend, lever means extending into said shoe and adapted to provide the leverage for manual effort for fabricating the bend in said pipe, a calibrated tape carried by said shoe in a protected location thereon and adapted to measure from the end of the pipe to indicate where bending should be performed to provide a length of pipe of predetermined dimension from the point of bending, means providing extending and retraction of the tape during use and subsequent transportation, and means for hooking the end of the tape to the free end of the pipe and in which the tape is calibrated so that the length of the free end from the bend is read directly from the indicia on the tape whereby the bending tool is accurately located at the place of making a bend to yield a precise location of the free end when the 90° bending is completed.

References Cited by the Examiner

UNITED STATES PATENTS

| | | | |
|---|---|---|---|
| 2,023,408 | 12/1935 | Coll | 30—131 X |
| 2,023,409 | 12/1935 | Coll | 30—123 X |
| 2,349,525 | 5/1944 | St. Clair. | |
| 2,630,033 | 3/1953 | Stover. | |
| 2,817,986 | 12/1957 | Benfield. | |
| 2,887,917 | 5/1959 | Kowal. | |
| 2,952,025 | 9/1960 | Johnson | 30—293 X |
| 3,119,424 | 1/1964 | Henry. | |

FOREIGN PATENTS 611,626   6/1935   Germany.

WILLIAM FELDMAN, *Primary Examiner.*

MICHAEL BALAS, *Examiner.*

J. L. JONES, JR., *Assistant Examiner.*